(No Model.)  
8 Sheets—Sheet 1.

A. G. CUMMINGS.
RAILWAY SIGNAL.

No. 361,617.  
Patented Apr. 19, 1887.

Attest  
Sidney P. Hollingsworth  
Wm. L. Kennedy

Inventor.  
A. G. Cummings  
By his Atty  
Philip T. Dodge

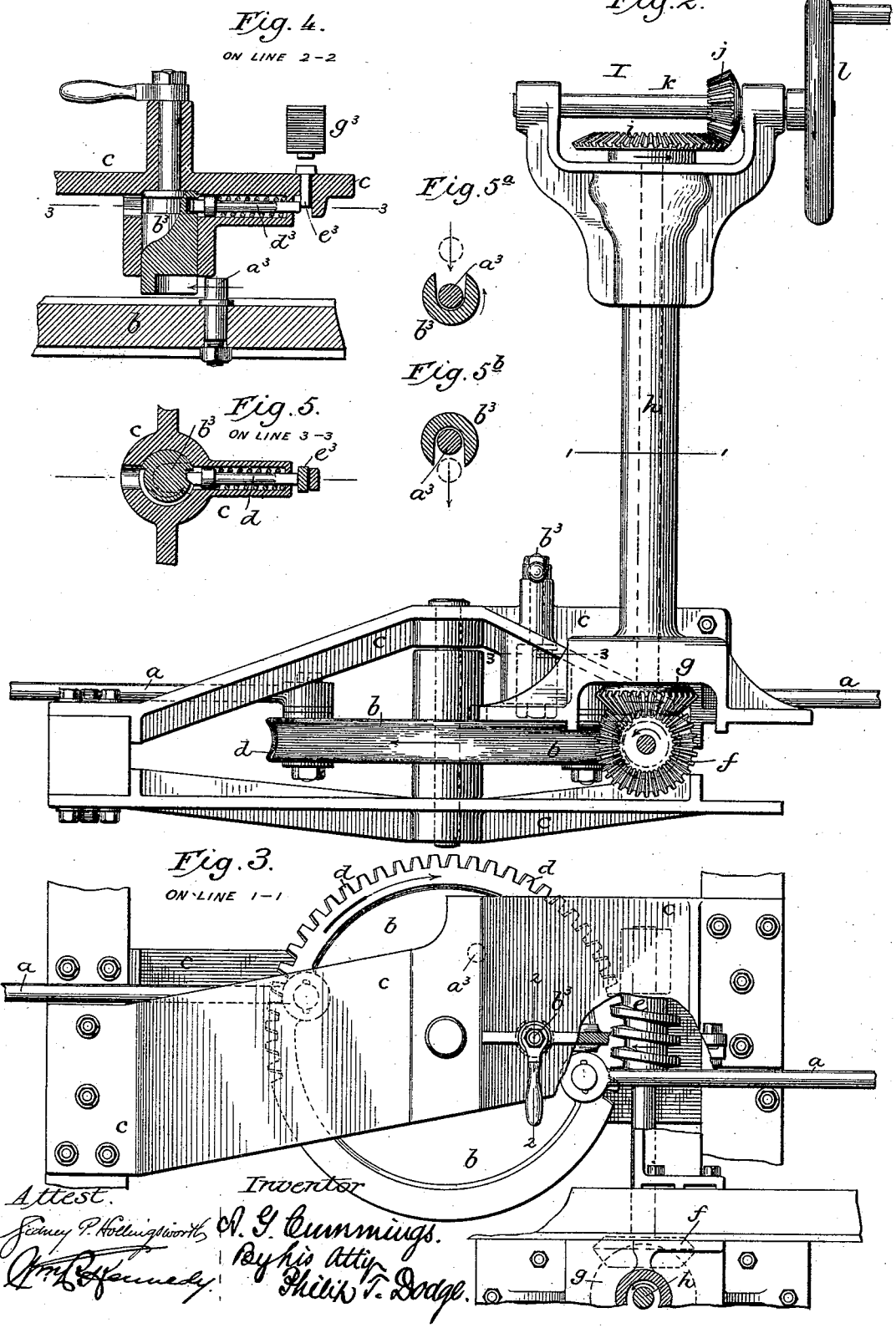

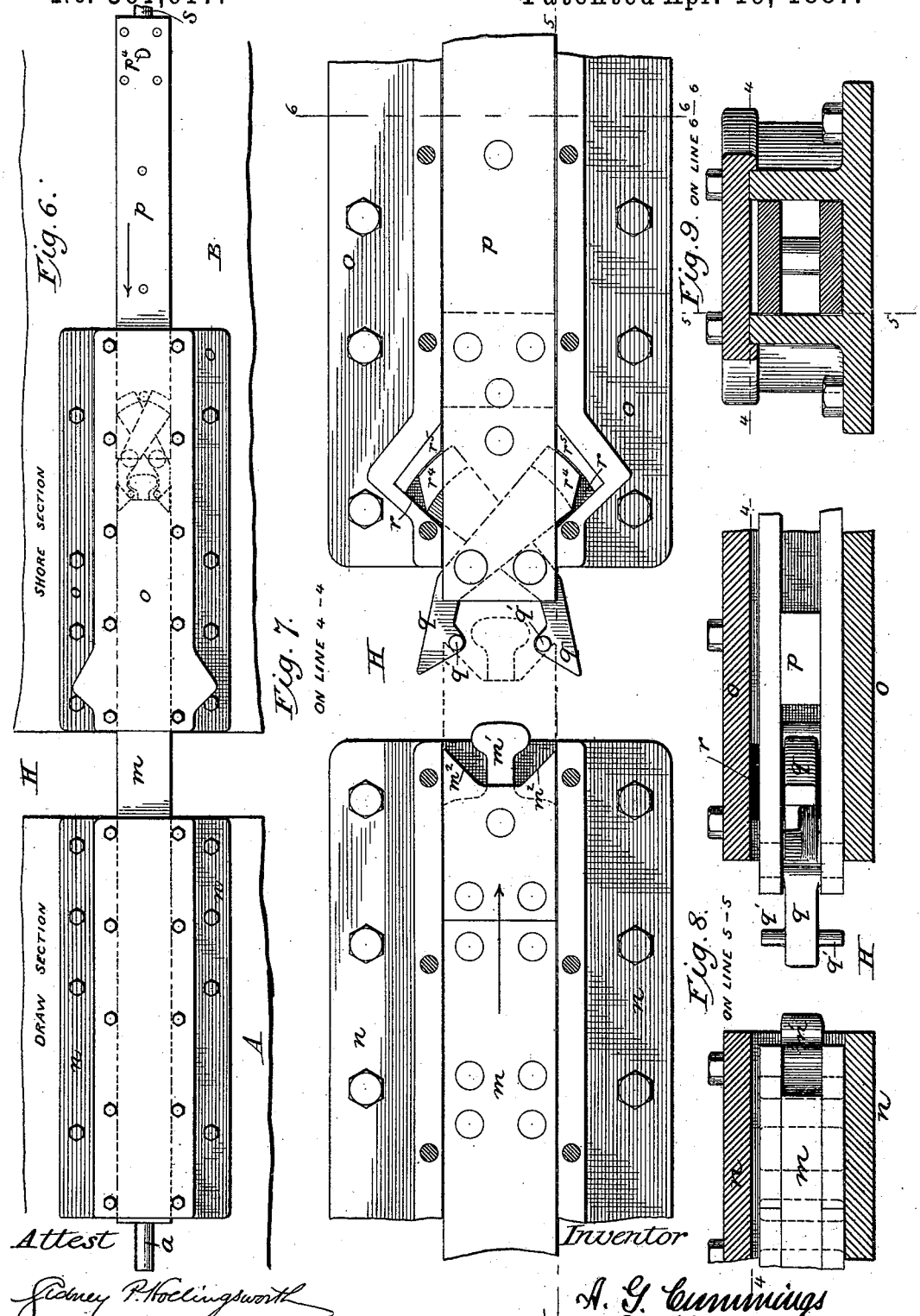

(No Model.) 8 Sheets—Sheet 4.

A. G. CUMMINGS.
RAILWAY SIGNAL.

No. 361,617. Patented Apr. 19, 1887.

Attest
Sidney P. Hollingsworth
Wm. R. Kennedy

Inventor
A. G. Cummings.
By his Atty
P. T. Dodge (No Model.) 8 Sheets—Sheet 5.
A. G. CUMMINGS.
RAILWAY SIGNAL.
No. 361,617. Patented Apr. 19, 1887.
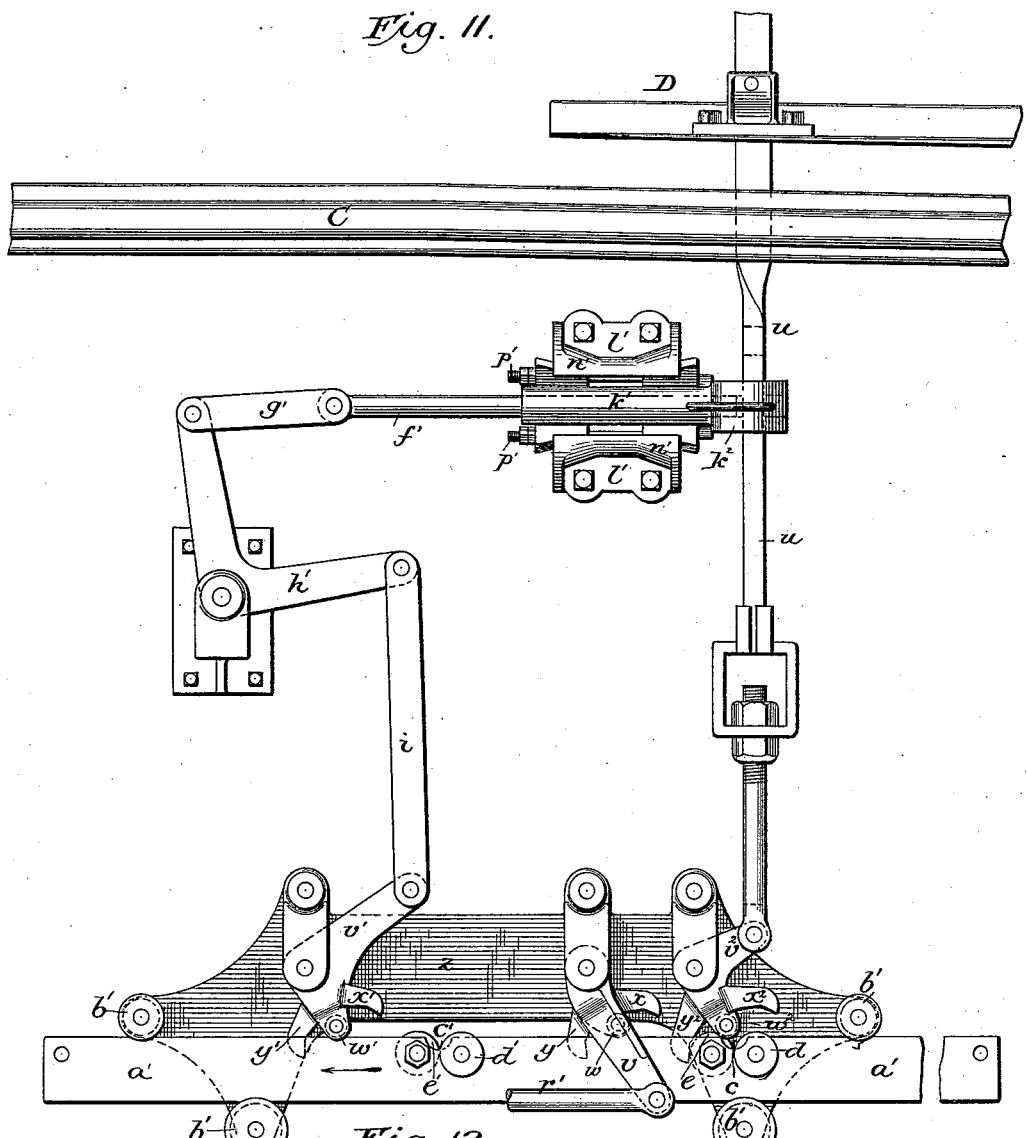
Fig. 11.
Fig. 12.
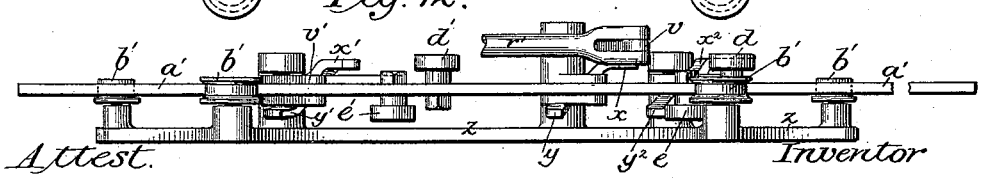

(No Model.) 8 Sheets—Sheet 6.

A. G. CUMMINGS.
RAILWAY SIGNAL.

No. 361,617. Patented Apr. 19, 1887.

ON LINE 9—9

ON LINE 10—10

ON LINE 8—8

Attest
Sidney P. Hollingsworth
Wm R Kennedy

Inventor
A. G. Cummings,
By his Atty,
Philip T. Dodge.

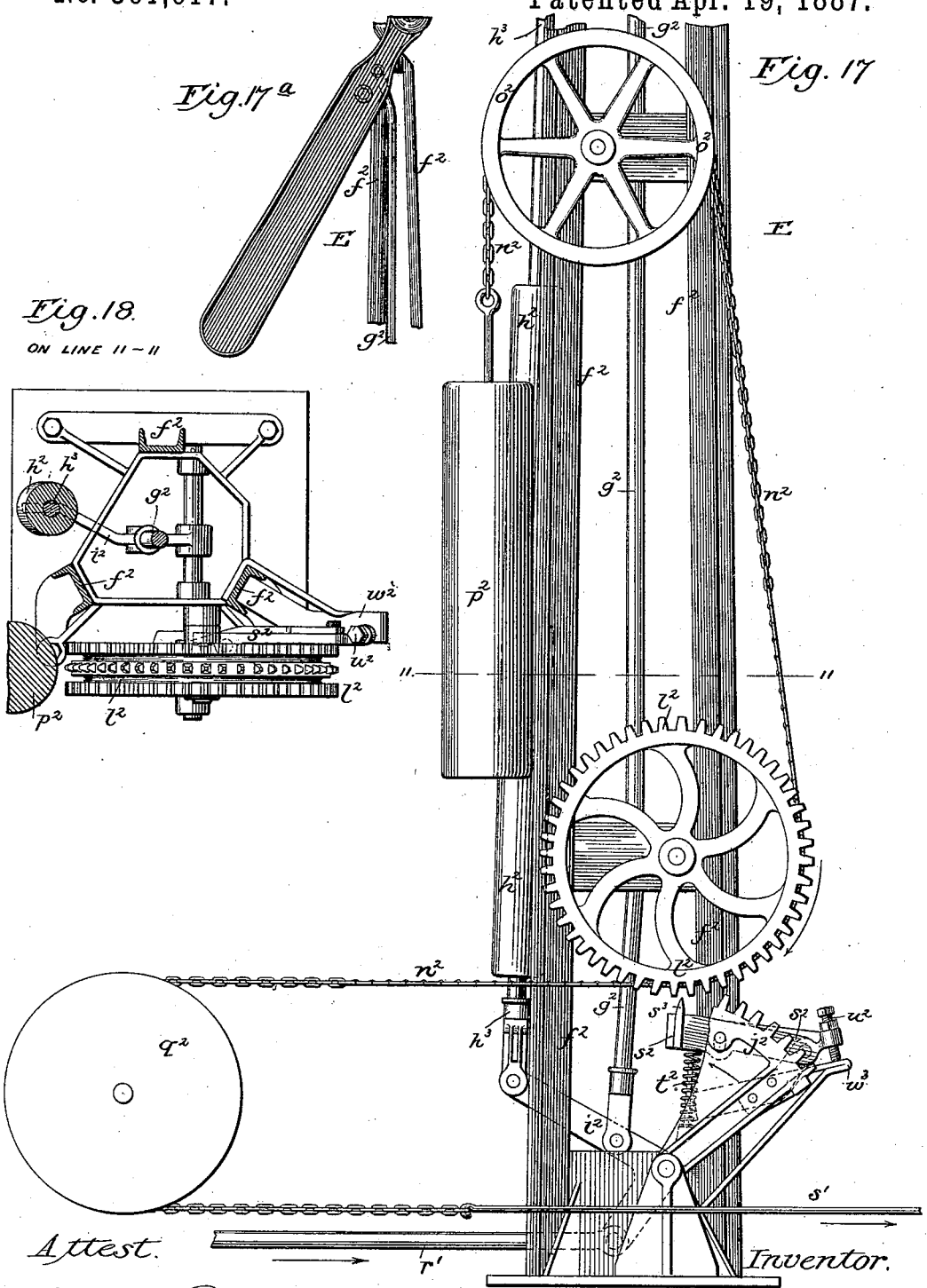

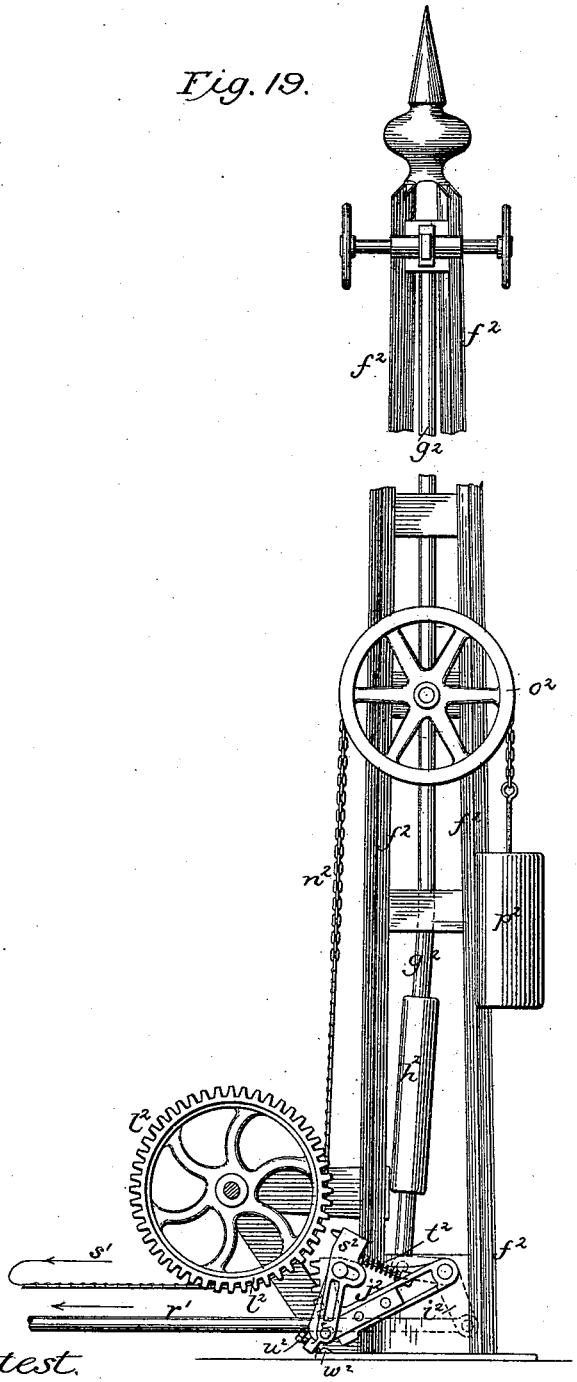

UNITED STATES PATENT OFFICE.

ALBERT G. CUMMINGS, OF HARRISBURG, ASSIGNOR TO THE UNION SWITCH AND SIGNAL COMPANY, OF PITTSBURG, PENNSYLVANIA.

RAILWAY-SIGNAL.

SPECIFICATION forming part of Letters Patent No. 361,617, dated April 19, 1887.

Application filed June 7, 1886. Serial No. 204,299. (No model.)

*To all whom it may concern:*

Be it known that I, ALBERT G. CUMMINGS, of Harrisburg, in the county of Dauphin and State of Pennsylvania, have invented certain Improvements in Railway-Signals, of which the following is a specification.

My invention has reference to railroad-signal systems in which devices locking or controlling a draw-bridge, switch, or equivalent movable track-section are so combined with the signal proper that a disturbance of the track is preceded by a proper adjustment of the signal.

The invention embraces a combination of a draw-bridge-locking device with signal-operating devices, and also with devices controlling a switch to divert approaching trains from the draw-bridge when the latter is unlocked.

It further embraces various minor combinations and devices employed in the main combination above recited, but also adapted for use in other places, and particularly in peculiar automatic couplings whereby the locking-bolt carried in the bridge communicates motion to the signal mechanism on shore, and in the devices by which the signal, the switch, and the switch-locking devices are operated, as hereinafter more fully explained.

Figure 1:
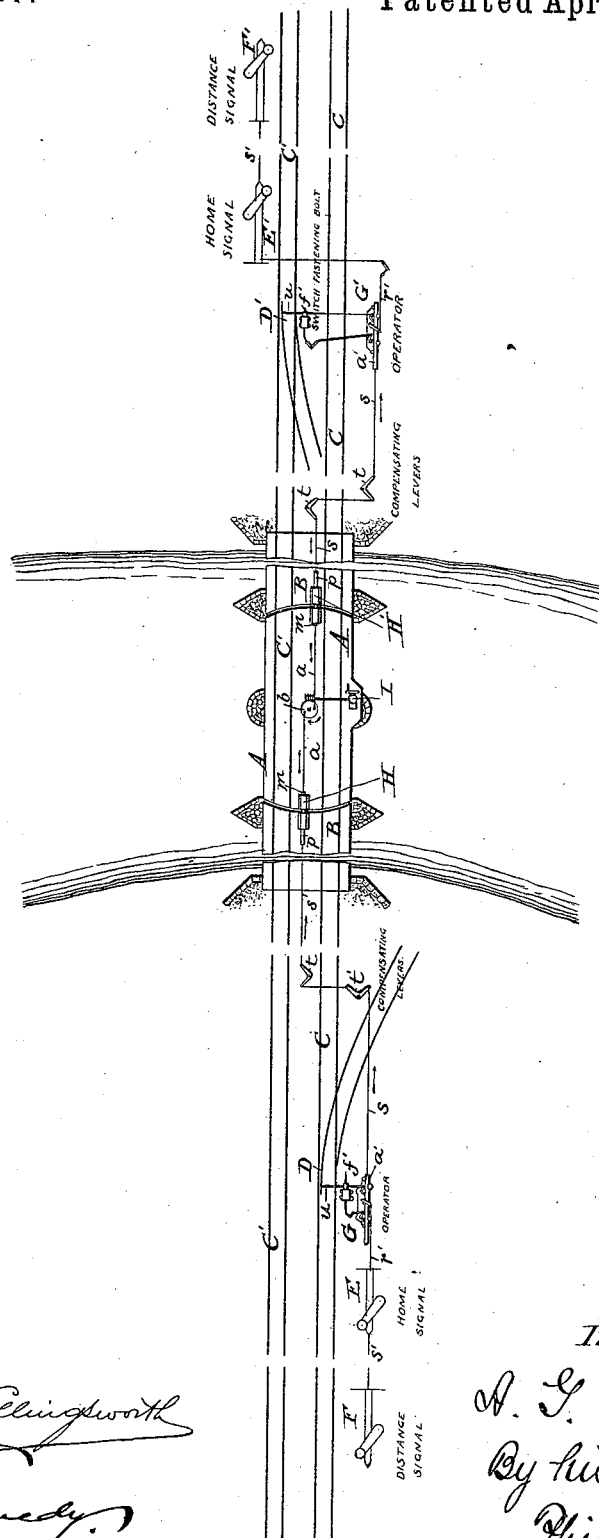
Figure 10:
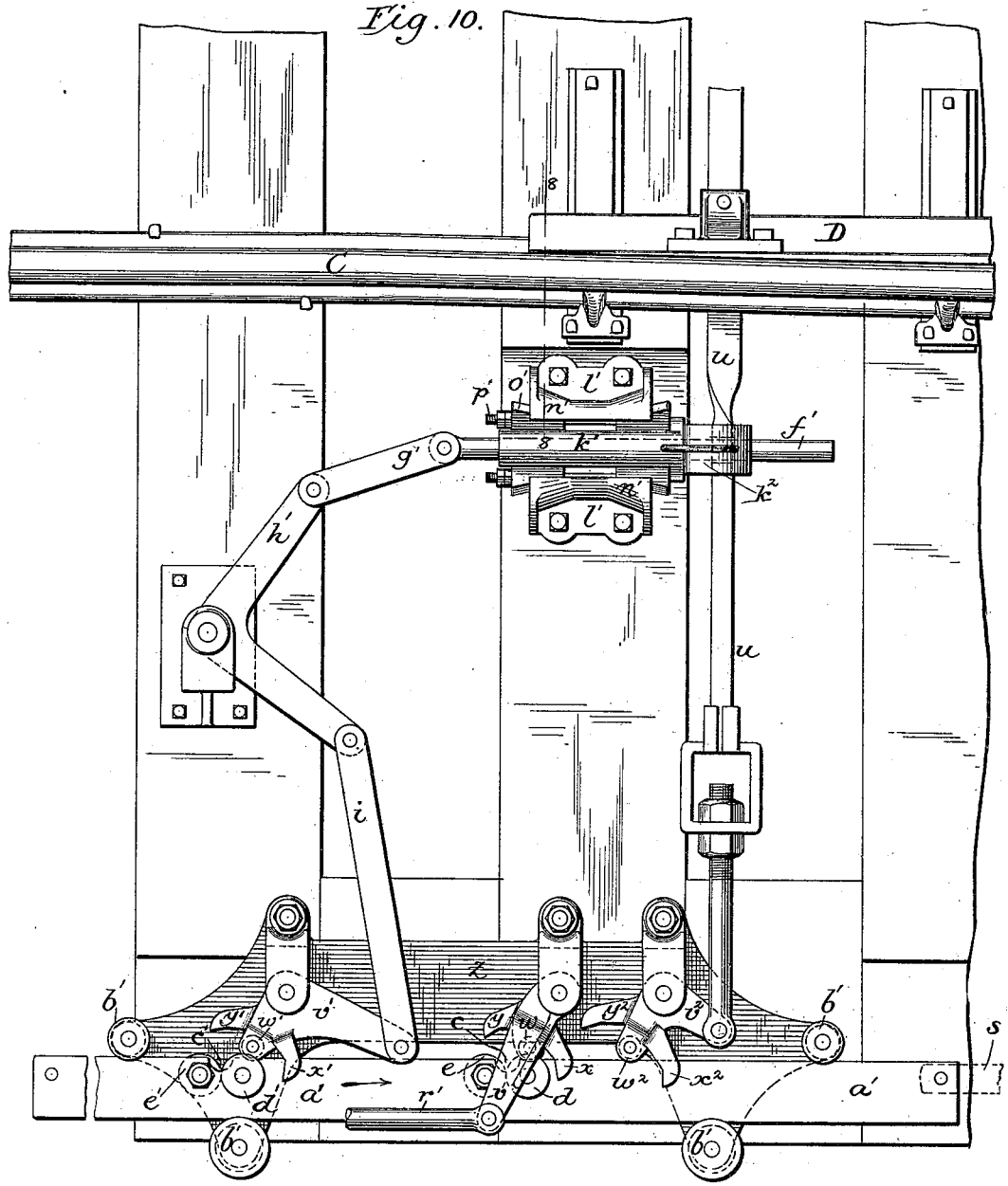
Figure 10A:
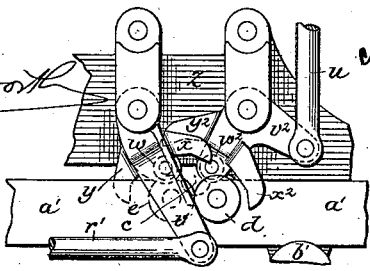
Figure 13:
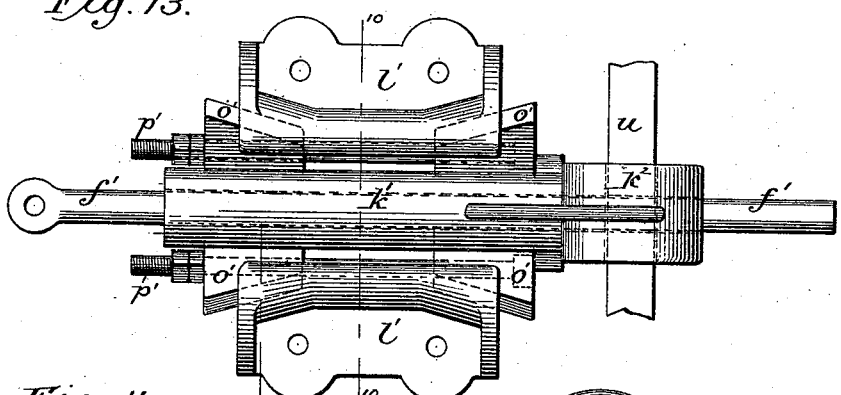
Figure 14:
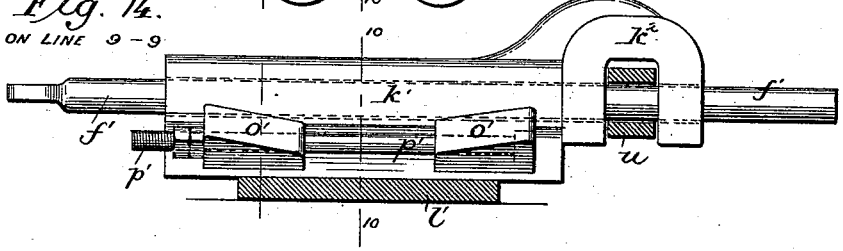
Figure 15:
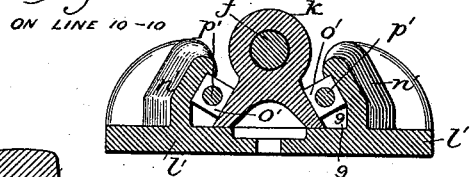
Figure 16:
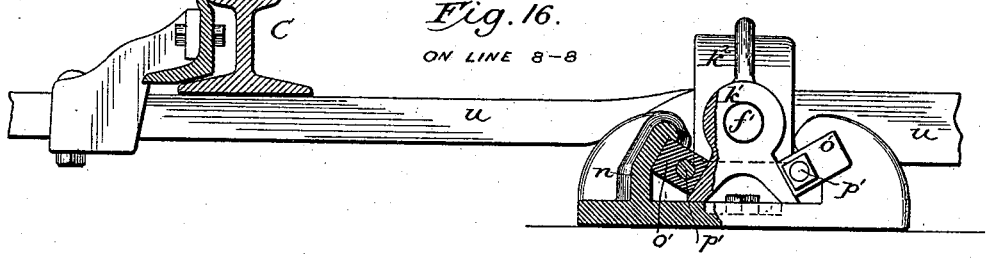

Figure 1 is a plan view, in the nature of a diagram, illustrating my system and appliances combined with a horizontally-swinging drawbridge. Fig. 2 is a side elevation of the manual devices through which the system is operated. Fig. 3 is a horizontal section on the line 1 1 of Fig. 2, looking in a downward direction, a portion of the base-frame being broken away to expose parts located therein. Fig. 4 is a vertical cross-section on the line 2 2 of Figs. 2 and 3. Fig. 5 is a horizontal section on the line 3 3 of Fig. 2. Figs. 5$^a$ and 5$^b$ are diagrams illustrating the action of the parts shown in the two preceding figures. Fig. 6 is a plan view of the draw-locking bolt and the devices engaging directly therewith, the parts being shown in their connected or locked position. Fig. 7 is a horizontal section of the parts shown in the preceding figure in their interlocked or disconnected position. Fig. 8 is a vertical section on the line 5 5 of Fig. 7. Fig. 9 is a cross-section on the line 6 6 of Fig. 7. Fig. 10 is a top plan view of the switch operating and locking devices and the adjacent devices for operating the signal, the switch being in its normal or closed position. Fig. 10$^a$ is a view showing the operative device of Fig. 10 in an intermediate position. Fig. 11 is a plan view of the same, the parts being in their unlocked position with the switch open. Fig. 12 is a side elevation of the parts shown in the preceding figure. Fig. 13 is a top plan view of the switch-locking devices. Fig. 14 is a vertical longitudinal section on the line 9 9. Fig. 15 is a cross-section on the line 10 10 of the two preceding figures. Fig. 16 is a cross section on the line 8 8 of Fig. 10, looking in the direction indicated by the arrow. Fig. 17 is a side elevation of the inner or home signal-post, with compensating and operating device for distant signal-connection, the upper portion, which is of ordinary construction, being omitted. Fig. 17$^a$ is a side elevation of the upper portion of the signal and semaphore. Fig. 18 is a horizontal section on the line 11 11 of the preceding figure, looking in a downward direction. Fig. 19 is a side elevation of the home signal-post in a modified form of compensating and operating device for distant signal-connection for use with switches which stand in a normally open position.

Referring first to the general arrangement of the parts with reference to each other, attention is directed to Fig. 1, in which A represents the centrally-pivoted horizontally-turning draw-bridge, and B B' the adjacent spans or abutments with which its ends make connection in the ordinary manner.

C C' represent the two tracks of a railway extending side by side across the bridge.

D D' represent two switches operating in connection with the respective tracks on opposite sides of the bridge and at any suitable distance therefrom, their purpose being to divert an approaching train from its course to the draw when not stopped in obedience to the danger-signal. These switches may be of any appropriate form adapted to derail the train or to direct the same upon a siding or safety-track leading to any suitable point, the only requirement being that they shall, when properly adjusted, prevent the train from continuing its course toward the open draw.

E E' represent two danger-signals located at opposite sides of the bridge to indicate the position of the draw, and commonly designated, by reason of their proximity to the bridge, as the "home" signals.

F F' represent the two cautionary-signals located at distant points to indicate the position of the draw, and commonly denominated, by reason of their position, as "distant" signals.

G G' are mechanisms located one at each side of the bridge to effect and control the operation of the adjacent switch and signals.

H H' are sliding bolts of peculiar construction located at opposite sides of the bridge and serving the twofold purpose of locking the draw in position and of transmitting motion from the switch-operating devices on the bridge to the switches and signals, as hereinafter fully explained.

I represents a hand-wheel or other manual device located on the draw and serving to control the bolts, and, through the bolts, the switches and signals, as will hereinafter appear, the organization being such that the draw-bridge can only be unlocked and opened when the signals are set at "danger" and the switches adjusted to prevent the passage of the train from either direction to the bridge. As the locking-bolt, the switch, the signals, and all the intermediate connections at one side of the bridge are duplicates of those at the other, I have illustrated and will describe the parts at one side only.

The operating mechanism through which the various parts are controlled by the draw-bridge keeper or other attendant are fully illustrated in Figs. 1, 2, 3, 4, and 5. The locking-bolts of the bridge are connected by operating-rods $a$ to pivots on opposite sides of a horizontal wheel, $b$, mounted on the draw-bridge in a suitable supporting-frame, $c$. This wheel $b$ has peripheral worm-teeth $d$, engaged by a worm, $e$, the shaft of which carries a miter-gear, $f$, engaging a gear, $g$, on a vertical shaft, $h$, the upper end of which is in turn provided with a gear, $i$, engaging a pinion, $j$, on a shaft, $k$, provided with a crank or hand wheel, $l$. These operative parts are mounted in a rigid metallic frame of the form represented in the drawings, or of any other appropriate form, this frame not being of the essence of my invention. By turning the hand-wheel the operator is enabled, through the intermediate parts, to lock or unlock the two bolts H simultaneously.

In order to operate the shore switches and signals by the bolts it is necessary that the latter shall be constructed so as to engage automatically and securely with movable parts on the abutments or stationary portions of the bridge. These interlocking parts may be variously constructed; but after the trial of different plans I recommend the peculiar construction of parts shown in Figs. 6 to 9, in which $m$ represents the bolt proper arranged to slide horizontally in a guide-plate, $n$. At its outer or shore end the bolt $m$ is formed with a central T-shaped head, $m'$, and with two inwardly-inclined shoulders, $m^2$, on opposite sides of this head. On the abutment, in position to coincide with the bolt $m$ when the draw is closed, I arrange in a fixed guide-plate, $o$, a second sliding bolt, $p$, carrying at its forward end two pivoted jaws, $q$, designed to grasp the head $m'$ of the bolt $m$, so that the latter may transmit a longitudinal motion to the bolt $p$. The jaws $q$ are each provided with a pin, $q'$, in such position that when the bolt $m$ is moved endwise toward the bolt $p$, as indicated by the arrow in Fig. 7, the inclined shoulders $m^2$ will act against the outer sides of these pins, as shown by the dotted lines, and force the jaws $q$ inward, causing them to grasp the head $m'$ between them. The continued advance of the bolt $m$ will carry the bolt $p$ backward, the jaws $q$ sliding therewith backward into the guide $o$, which is also entered by the bolt $m$, as shown by dotted lines in Fig. 6.

It will be observed that when the bolt $m$ is thus thrust outward into the plates $o$ it serves to lock the draw against lateral motion, or, in other words, to hold it closed, so that the continuity of the track cannot be destroyed. It also answers at the same time, by reason of its engagement with the dogs $q$, the additional purpose of communicating end motion to the bolt $p$, and through said bolt to the distance switches and signals, as hereinafter explained.

In order to insure the proper action of the dogs in engaging and disengaging the bolt $m$, and to prevent the elastic contraction of the connection S from displacing the bolt $p$ after disengagement has taken place, they are extended rearward beyond their pivots and carried each across the other in such manner that when their forward ends are opened to admit the head $m'$ their tail ends will be projected beyond the edges of the bolt $p$. In order to permit this opening action of the jaws when the bolt $m$ is fully retracted, but at no other time, the guide $o$ is provided with recesses $r$, which have shoulders $r^5$, fitted to engage with the shoulders $r^4$ on the tail ends of the jaws $q$, as shown in Fig. 7. As the bolt $m$ is retracted to unlock the draw it pulls the bolt $p$ positively forward in the direction of the arrow in Fig. 6 until the tail ends of the jaws are brought to the recesses $r$ when the parts disengage, as shown in Fig. 7, any further movement of the bar $p$ being prevented by stop-pin $p^4$, Fig. 6, the tail ends of the jaws entering the recesses $r$, and preventing any retractive movement of the shore end of the connection, and thus preventing any disarrangement of the parts on the shore end during such time as the bolt $m$ remains withdrawn. The forward and backward motion of the bolt $m$ causes a positive connection and disconnection with the bolt $p$.

It is manifest that either one of the jaws $q$ could be used alone in connection with the head on the bolt *m*; but it is preferred to employ the two jaws to prevent side strains and to secure greater certainty of action.

It is also obvious that other disengaging devices can be employed to connect the bolts *m* and *p*, when provided with retaining-shoulders, to prevent retractive movement of the bar P while disengaged.

From each bolt *p* a rod, *s*, is extended to the switch and signal operating devices G, which will be presently described. This operating-rod may be continuous or it may be divided and its sections united by intermediate levers or cranks *t*, of known form, commonly designated as "compensators," to neutralize the expansion and contraction of the rod.

Referring now to Fig. 1, the signals are shown to indicate "safety," and in order to unlock the draw the first movement is to set the signals to indicate "danger" and partially withdraw the switch-locking bolt; secondly, to complete the withdrawal of the switch-locking bolt and open the switch. The mechanism by which these movements are effected is shown in Figs. 10 to 18, inclusive. As shown in Fig. 10, a horizontal reciprocating bar, $a'$, attached to the operating-rod *s*, before mentioned, is guided by rollers $b'$ on a bed-plate, $z$, on which are pivoted levers $v$, $v'$, and $v^2$, which respectively operate the signals, switch-locking bolt, and the switch. One end of the signal-operating lever *v* is pivoted on the bed-plate $z$, and the opposite end is attached to rod $r'$, leading to the signals. The lever $v$ is provided with two arms, $x$ and $y$, projecting horizontally, one at a higher level than the other, in opposite directions, and also with an intermediate projection carrying a friction-roller, $w$. The bar is formed with a notch, $c$, in its edge, and provided on its upper and lower surfaces, respectively, and on opposite sides of this notch, with two horizontal rollers, $d$ and $e$.

In the movement of the signal-lever $v$, above described, the arm of the signal-lever $v$ comes over the arm $y^2$ of the switch crank-lever $v^2$, as shown in Fig. $10^a$. By arranging the arms $x$ and $y^2$ on different planes, so that they can pass each other freely, I am enabled to pivot the signal-lever $v$ and switch crank-lever $v^2$ so close together that both may receive their movement from the same rollers, $e$ and $d$, and notch $c$ on bar $a'$. When the signal stands at "safety" the operating mechanism is as shown in Fig. 10. As the bar $a'$ is moved in the direction indicated by the arrow, the roller $d$ will encounter the arm $x$, and advancing will partially operate the lever $v$, so that the roller $w$ will enter the notch $c$, and, by the continued advance of the bar $a'$, will complete the movement of the lever $v$, and, through the connection $r'$, set the signals to "danger." The bar $a'$ is formed with a second notch, $c'$, in its edge and provided with rollers $d'$ and $e'$, (placed relatively to the notch $c'$ as the rollers $d$ and $e$ are to the notch $c$,) and a crank-lever, $v'$, for operating the switch-locking bolt $f'$, is arranged to engage therewith in the manner just described, the notch $c'$ being so located that the movement of the bar $a'$ will cause the switch-locking bolt $f'$ to be partially withdrawn from the switch-rod $u$ by the time the signals have been set to "danger," but not fully withdrawn from engagement with the switch-rod $u$ until by the continued movement of the bar $a'$ the roller $d$ has been brought into engagement with the projection $x^2$ on the crank-lever $v^2$ by which the switch is thrown. The further continued movement of the bar $a'$ will operate the crank $v^2$, in the same manner as previously explained, opening the switch D by the switch-rod $u$. The continued movement of the bar $a'$ carries the notch $c$ beyond the roller $w^2$, so that the edge of the bar $a'$ bears against the rollers $w$, $w'$, and $w^2$, holding the levers $v$, $v'$, and $v^2$ in their new positions, as in Fig. 11, keeping the signals at "danger" and the switch unlocked and open.

In order to secure the switch in its closed position and insure safe operation of the mechanism, the switch-rod $u$ is provided with a transverse hole or notch, $u'$, to receive a locking-bolt, $f'$, which moves horizontally in a suitable guide. This bolt is connected by a link, $g'$, to a crank-lever, $h'$, which is in turn connected by another link, $i'$, to the crank-lever $v'$, the operation of which is the same as before explained in connection with the operation of the signal-lever $v$. The parts are so adjusted that, when the switch is closed, as in Fig. 10, and the bar $a'$ moved in the direction shown by the arrow after it has operated the signal-lever $v$, it will complete the operation of the locking-bolt lever $v'$ and withdraw the bolt $f'$ from the switch-rod $u$, thus unlocking the switch and subsequently operating the lever $v^2$ to open the switch.

In order that the locking-bolt may be properly guided and caused to enter properly the opening in the switch-rod, I have devised a peculiar guide. (Shown in detail in Figs. 13 to 16.) The distinguishing feature of this guide is that I provide a tubular guide-piece secured upon a stationary bed-plate with provision for longitudinal (also horizontal) adjustment, as may become necessary by reason of the shifting of the rails of the switch or track. As shown in Figs. 13 to 16, the tubular guide-piece $k'$ is provided with longitudinal flanges vertically inclined and arranged, so that by forcing onto the surface of said flanges suitable holding devices the base of the tubular guide-piece $k'$ will be forced against the stationary bed-plate and secured thereon. There are numerous methods of adjustably securing the guide-piece $k'$ to the stationary bed-plate; but I prefer the method shown in Figs. 13, 14, 15, and 16, in which the stationary bed-plate $l'$ is made with longitudinally and inwardly inclined flanges $n'$, and at each end of the guide $k'$, I insert between its flanges and the flanges $n'$ on opposite sides two wedges, $o'$, which serve to hold the guide down firmly in place on the bed-plate. By loosening these wedges the guide is released, so that it may be adjusted longitudinally, and by adjusting the several wedges endwise in proper relations to each other the guide may be adjusted laterally at either or both ends, as required. As a convenient means of securing the wedges, I employ two bolts, $p'$, one on each side, passing through and connecting the wedges at the opposite ends.

I prefer to form the guide $k'$ with a jaw or head, $k^2$, to clasp over the switch-operating bar $u$, as shown in Fig. 14.

Referring now to the details of the home signal, attention is directed to Figs. 17 and 18, in which $f^2$ represents the signal-post, and $g^2$ a vertically-movable rod connected at its upper end to a semaphore-signal, as represented in Fig. 17$^a$, or any other appropriate signaling device, of which there are known in the art at the present day many suitable for my purpose. At its lower end the rod $g^2$ is connected to an angular lever, $i^2$, another arm of which is jointed to the operating-rod $r'$, before alluded to, so that when the rod $r'$ is moved preparatory to the unlocking of the switch, it will, by lowering the rod $g^2$, set the signal at "danger."

To effect the movement of the distant signal simultaneous with the operation of the home signal, a wire-connection, $s'$, extends from the distant signal to the home-signal post, where it terminates in a chain, which, by means of a guide-pulley, $q^2$, is led over a sprocket driving-wheel, $l^2$, adapted to engage a section of said chain, thence over guide-pulley $o^2$, and attached to an operating-weight, $p^2$. The sprocket-wheel is provided on each side with cogs adapted to engage with a sector-rack, $j^2$, which is fixed on the shaft of the angular lever $i^2$, so that whenever the rod $r'$ is moved to operate the home signal the sector-rack $j^2$ will be brought into engagement with the cogs on the sprocket-wheel and give it a certain amount of rotation, raising the operating-weight and slacking the wire-connection $s'$, and allowing the counter-weight attached to the distant signal to operate it.

To insure the proper engagement of the cogs of the sector-rack $j^2$ with cogs of the wheel $l^2$, I pivot to the sector-rack $j^2$ a yielding arm, $s^2$, provided with a cog, $s^3$, which, when the sector-arm starts forward toward the wheel, is urged into engagement with the wheel, preferably by a spring, $t^2$, and moves the wheel in such manner that its cogs are brought into proper position to enter between the cogs of the sector-rack. When the sector rack $j^2$ is withdrawn, (in returning the signals to position to indicate "safety,") an adjusting-screw, $u^2$, on the rear end of the arm $s^2$ encounters a stationary arm, $w^3$, and trips the cog out of contact with the wheel, as shown in Fig. 17.

The arrangement of a yielding cog, as above explained, to engage with the toothed wheel in advance of the rack I have adopted as a preferable form; but this feature may be varied without departing from the scope of my invention, providing a yielding cog is arranged to engage the wheel in advance of the rack.

The distant signal may be of any ordinary construction, provided with a counter-weight sufficiently heavy to pull the slack wire and cause the signal to indicate "danger."

To the end of the angular lever $i^2$ there is attached a safety-weight, $h^2$, provided with a rod-extension, $h^3$, by which the vertical position of the weight is maintained. The attached weight of the safety-weight $h^2$ is sufficient to overcome the friction and raise the operating-weight $p^2$, thus insuring, in case the rod $r'$ is broken, that the home and distant signals will be set to "danger."

As an extreme precaution to prevent the attendant from opening the switch inadvertently, I propose to provide, when desired, means for automatically arresting the action of the parts after the signals are adjusted and before the switch is opened, so that the attendant, having partially performed the operation, will be required to unlock the parts before completing their movement. This action is advantageous in that it allows time for the operator to assure himself of the propriety of his action before disturbing the track. A simple means for this purpose is illustrated in Figs. 2, 3, 4, and 5.

It will be remembered that the wheel $b$ communicates motion to the switch and signal mechanism. In this wheel I fix a pin, $a^3$, and in the frame above the wheel I mount a vertical rotary spindle, $b^3$, having its upper end provided with an operating-handle and its lower end made of a crescent form, as shown in the several figures. This spindle stands normally in the position shown in Figs. 1 and 5$^a$, its lower end standing in the path of the stud $a^3$, so that when the wheel $b$ has moved a sufficient distance to set the signals the stud will encounter the spindle and thus prevent further motion of the wheel. The attendant is now compelled to give the locking-spindle a half-revolution, which carries its lower end around the stud $a^3$ to a position in its rear, as shown in Fig. 5$^b$, whereupon the motion of the wheel may be continued to unlock and move the switches. In order to lock the spindle $b^3$ in its normal position I propose to employ a sliding spring-actuated bolt, $d^3$, one end of which enters a beveled notch in the spindle, while the opposite end is in position to abut against a movable gag, $e^3$, interposed between the bolt $d^3$ and the frame. This gag may be removed in any manner, but, as shown to illustrate its operation, it is to be lifted. The gag must be lifted before the spindle can be turned. It may be lifted, as shown in Fig. 4, by the action of an electro-magnet, $g^3$, in an electric circuit, which may be controlled by known instrumentalities from the advancing trains or otherwise.

While I have described above and prefer to use, under ordinary conditions, a normally-closed draw and switch in connection with signals at "safety," when a system is to be used in which the draw will stand normally in an open position, and require, therefore, the signals to stand normally in the position indicating "danger," I use the construction shown in Fig. 19. This is substantially the same as that shown in Fig. 17, except that the parts are adjusted so that the movement of the rod $r'$ lowers the signal-arms, the weight $p^2$ in this case serving as a tension-weight only, the counter-weight on the distant signal acting as the operating-weight to set the signal at "danger."

The operation of my apparatus, using the normally-closed switch, is as follows: The parts stand ordinarily in the position shown in Figs. 1, 2, 3, 6, and 10. When the draw is to be opened the operator turns the hand-wheel $l$, Figs. 1 and 2, in the direction indicated by the arrow, thereby communicating motion through the gear to the wheel $b$, which, through the rods $a$, operates the bolts $m$, thereby unlocking the draw. The bolts $m$, before they are moved far enough to unlock the draw, move the bolts $p$, which, through the rods $s$, operate the devices G, which first set the signals to "danger," and afterward unlock and open the switch. At the time the motion is completed the bolts $m$ disengage from the bolt $p$, leaving the draw free to open. When required to restore my apparatus to the normal position, in which the signals are at "safety," the operator turns the hand-wheel $l$ in the reverse direction, thus moving bolt $m$, bringing the head $m'$ within the jaws $q$ of the bolt $p$ by the action of the inclined surfaces of $m^2$ against the pins $q'$, completing the automatic connection and releasing the shoulders $r^4$ on jaws $q$ from engagement with the shoulders $r^5$, and freeing bolt $p$ and connection $s$ for the movement requisite to close and lock the switch and set the signals to "danger."

Referring to Fig. 11, by the movement of bar $a'$ in the direction indicated by the arrow the roller $e$ will encounter the arm $y^2$ and partially operate the crank-lever $v^2$, so that the roll $w^2$ will enter the notch $c$, and by the continued movement of the bar $a'$ complete the movement of the crank-lever $v^2$, and through the switch-rod $u$ close the switch D. The continued movement of the bar $a'$ causes roller $e'$ to encounter arm $y'$ on crank-lever $v'$, and through the connections $i$, $h'$, and $g'$ push the locking-bolt $f'$ through the opening $u'$ in the switch-rod $u$, thus locking the switch D. Soon after the switch-locking bolt $f'$ has entered the opening $u'$ the roller $e$ encounters the arm $y$ of the crank $v$, by which its movement through the rod $r'$ sets the signals at "safety."

Should the operation above mentioned fail to bring the opening $u'$ in the switch-rod $u$ to its proper position, the end of the locking-bolt $f'$ will encounter the switch-rod $u$, and thus prevent the further movement of the bar $a'$, requisite to effect any movement of the signal-lever $v$, thus compelling the correct adjustment of the switch D, to enable the safety-signals to be given.

It is obvious that the construction of the switch and signal moving mechanism G can be varied in various particulars without departing from the scope of my invention, as by properly locating the pivots of the levers by which the signal, switch-locking bolt, and the switch are respectively operated the levers may be so formed that both the arms on each lever may be on the same plane; also, by shaping the arms so that the movement will be produced wholly by engagement thereon of projecting pins or rollers on the bar $a'$, dispensing with the notches in the edges of the bar and the anti-friction rolls in the levers.

Having thus described my invention, what I claim is—

1. In combination with a draw-bridge, a movable locking-bolt applied thereto and adapted to engage a plate or keeper on the abutment or shore section of the bridge, a shore signal, a slide connected with and arranged to operate the shore signal, and automatically-acting movable jaws, substantially as described, attached to said slide and adapted to positively engage and disengage the locking-bolt as it is moved to and fro, whereby the locking and unlocking of the draw is caused to effect the adjustment of the signal.

2. In combination with the sliding locking-bolt $m$, having a head, $m'$, and one or more shoulders, $m^2$, the signal-actuating slide $p$, provided with jaws $q$ and pins $q'$, adapted to cooperate with the head $m'$, and the guide $o$, whereby the jaws are held in a closed position during the retreat of the slide $p$.

3. In an automatic connecting and disconnecting signal-connection, the locking-shoulder $r^4$ and $r^5$, with sliding bolt and guide, substantially as described.

4. In combination with the bolt $m$, having a head, $m'$, and shoulders $m^2$, the slide $p$, its guide-plate $o$, provided with recesses $r$, and the pivoted jaws $q$, having studs $q'$, said parts combined for joint operation, substantially as described.

5. In combination with a draw-bridge and a railway-track leading thereto, a movable bolt to lock the bridge in a closed position, a switch to prevent the passage of approaching trains to the draw, and a switch-operating device connected with and operated by the locking-bolt, substantially as described, whereby the unlocking of the draw is caused to adjust the switch and thus prevent trains from advancing toward the open draw.

6. In combination with a draw-bridge and a bolt to lock the same in a closed position, a railway-track crossing the bridge and provided with a shore switch to divert trains therefrom, a shore signal, a locking-bolt to hold the draw in a closed position, and operating devices, substantially as described, extending from the bolt to the switch and the signal, whereby the operation of the bolt is caused to effect the double result of moving the switch and adjusting the signal.

7. In combination with the bridge-locking bolt, the switch and its operating-lever, the switch-locking bolt and its operating-lever, the signal and its operating-lever, and the reciprocating plate $a'$, constructed and arranged, substantially as described, to effect a movement of the signal, the unlocking of the switch, and the moving of the switch in the order named.

8. In combination with the switch-rod $u$, the lever $v^2$, having the roller and lateral arms in different planes, the switch-locking bolt $f'$, the lever $v'$, connected with said bolt and constructed with lateral arms similar to those of the first-named lever, and the reciprocating bar $a'$, provided with notches and rollers to operate the two levers, substantially as described.

9. In combination with the switch-rod and its lever $v^2$, with lateral arms, the signal-operating lever $v$, also provided with lateral arms, and the reciprocating bar $a'$, having the notch $c$ and rollers $d$ and $e$, said bar acting, as described, to move the levers $v$ and $v^2$, successively.

10. A lever provided with a roller, $w$, and lateral arms $x$ and $y$, projected therefrom in opposite directions and in different planes, in combination with a reciprocating bar, $a'$, provided with a notch, $c$, and rollers $d$ and $e$, on opposite sides, whereby the reciprocation of the bar is caused to effect the movement of the lever and to lock the same in each of its two positions.

11. In combination with a switch-locking bolt and a stationary bed-plate, a guide arranged for lateral adjustment, substantially as described.

12. In combination with the switch-rod $u$ and its locking-bolt $f'$, the adjustable guide consisting of the tubular body, its supporting-plate, and intermediate wedges, substantially as described.

13. In combination with the locking-bolt and its flanged tubular guide, the flanged base-plate $l'$, the wedges $o'$, and the bolts $p'$, said parts arranged substantially as described, whereby the tubular guide may be adjusted longitudinally and also adjusted laterally at either or both ends.

14. In a signal-instrument, the driving-wheel $l^2$, operated by a vibratory rack arranged to disengage therefrom, in combination with a yielding cog, $s^3$, arranged on the vibratory rack, substantially as described.

15. In a mechanical signal adapted to transmit to a second and distant signal, the rack $j^2$, in combination with the toothed wheel $l^2$, the weighted chain $n^2$, connected to the operating-rod of the distant signal, and cog $s^3$, fixed on the yielding arm $s^2$ and arranged to engage the wheel $l^2$, substantially as described, whereby the wheel is adjusted to bring its teeth in proper engagement with the teeth of the advancing rack.

16. In a signal-instrument, the driving-wheel $l^2$, in combination with the vibratory rack $j^2$, arranged to disengage therefrom, the yielding cog $s^3$, fixed on the arm $s^2$, carried by the rack, and the arm $w^3$, acting to disengage the arm from the wheel when the rack is disengaged.

17. In combination with the wheel $b$, acting to operate a signal and move a switch in the order named, a stop device, substantially as described, to arrest the movement of said wheel after the adjustment of the signal and before the movement of the switch, whereby it is rendered necessary to unlock the wheel between the adjustment of the signal and the movement of the switch.

18. In a signal system, the combination of the operating-wheel $b$ and its pin $a^3$ with the rotary stop-spindle $b^3$, having its lower end of substantially crescent form, as described and shown.

19. In combination with the wheel $b$ and its stop-pin $a^3$, the stop-spindle $b^3$, the bolt $d^3$, to hold said spindle in its normal position, and a gag or stop, $e^3$, to hold said bolt.

20. In a switch or signal system for a drawbridge, the combination of two abutting bars or pushers, one upon the draw and the other upon the shore section, operating mechanism upon the draw for transmitting motion from one to the other of said bars or pushers when adjusted in line with the draw closed, and a locking device for holding the bar or pusher on the shore section against movement when the bar or pusher on the draw is swung out of line therewith, substantially as described.

In testimony whereof I hereunto set my hand, this 26th day of May, 1886, in the presence of two attesting witnesses.

ALBERT G. CUMMINGS.

Witnesses:
 GEO. W. PARSONS,
 JOHN P. KELLER, Jr.